(12) United States Patent
Bouchereau et al.

(10) Patent No.: US 10,967,591 B2
(45) Date of Patent: Apr. 6, 2021

(54) CIRCUMFERENTIAL MEASUREMENT IN TIRE BUILDING PROCESSES AND DEVICES

(71) Applicant: COMPAGNIE GENERALE DES ETABLISSEMENTS MICHELIN, Clermont-Ferrand (FR)

(72) Inventors: David Bouchereau, Clermont-Ferrand (FR); Richard Moreau, Clermont-Ferrand (FR); Jeremy Reymond, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 77 days.

(21) Appl. No.: 16/301,886

(22) PCT Filed: May 3, 2017

(86) PCT No.: PCT/EP2017/060541
§ 371 (c)(1),
(2) Date: Nov. 15, 2018

(87) PCT Pub. No.: WO2017/198465
PCT Pub. Date: Nov. 23, 2017

(65) Prior Publication Data
US 2019/0291370 A1    Sep. 26, 2019

(30) Foreign Application Priority Data
May 18, 2016    (FR) ...................................... 1654392

(51) Int. Cl.
*B32B 41/00*    (2006.01)
*B29D 30/16*    (2006.01)
(Continued)

(52) U.S. Cl.
CPC ............. *B29D 30/16* (2013.01); *B29D 30/30* (2013.01); *B29D 30/60* (2013.01); *B29D 2030/4437* (2013.01)

(58) Field of Classification Search
CPC ........ B29D 30/16; B29D 30/60; B29D 30/30; B29D 2030/4437
(Continued)

(56) References Cited

U.S. PATENT DOCUMENTS 4,240,863 A    12/1980   Vinton
5,882,457 A    3/1999    Currie et al.
(Continued)

FOREIGN PATENT DOCUMENTS

DE         2819410 A1     11/1979
WO    2015/150970 A1     10/2015

OTHER PUBLICATIONS

International Search Report dated Aug. 9, 2017, in corresponding PCT/EP2017/060541 (3 pages).

*Primary Examiner* — Michael N Orlando
*Assistant Examiner* — Joshel Rivera
(74) *Attorney, Agent, or Firm* — Venable LLP

(57) ABSTRACT

A tire manufacturing method and system is provided for controlling a product profile having one or more elastomeric layers that are produced by continuously extruding an elongated element (200) of an elastomeric material and depositing the elongated element (200) upon a forming surface (100a) of a circumferentially rotating drum (100).

12 Claims, 7 Drawing Sheets

(51) Int. Cl.
  *B29D 30/30* (2006.01)
  *B29D 30/60* (2006.01)
  *B29D 30/44* (2006.01)

(58) Field of Classification Search
  USPC .................. 156/60, 64, 350, 351, 378, 379
  See application file for complete search history.

(56) References Cited

U.S. PATENT DOCUMENTS

| | | |
|---|---|---|
| 5,942,059 A | 8/1999 | Wulker et al. |
| 10,042,349 B2 | 8/2018 | Amurri |
| 2009/0283203 A1 | 11/2009 | Marchini et al. |
| 2017/0176970 A1 | 6/2017 | Amurri |
| 2019/0184662 A1* | 6/2019 | Watanabe .............. B29D 30/30 |
| 2019/0184663 A1* | 6/2019 | Yagi .................. B29D 30/3028 |

* cited by examiner

B - B

CIRCUMFERENTIAL MEASUREMENT IN TIRE BUILDING PROCESSES AND DEVICES

TECHNICAL FIELD

The invention relates generally to tire production. The invention relates more particularly to controlling a product profile by measuring a circumferential extent of a forming drum surface between production of material layers.

BACKGROUND

Tires are commonly constructed from multiple layers and components that are placed sequentially onto an expandable and contractable building drum. The circumferentially rotating drum is typically a cylindrical shape having a flat profile along the axial direction, although it may include recesses for accepting features such as circular beads. In some known techniques, a layer of air-impermeable rubber is laid onto a forming surface of a drum, and one or more carcass plies are placed thereon. Each ply extends between the bead portions on opposing sides of the tire, through the opposing sidewall portions, and across the crown portion of the tire. A pair of circular beads is placed on opposing drum sides and may include bead wires and bead fillers. The plies are turned up and the beads are moved towards each other to create a toroidal shape.

In some known techniques, a reel that collects elastomeric materials from an extruder can deliver the materials as elongated strips to the forming drum surface. The elongated strips are wrapped around the circumferential extent of the forming surface and bonded by one or more rollers. The speed of delivery is often controlled in relation to rotational speed, acceleration and the circumferential extent of the drum. The extrusion speed of the rubber strip may be adjusted as needed so as to approximate that of the forming surface. The tension of the rubber strip may also be adjusted and controlled.

During deposition of the elongated strips on the forming drum surface, irregularities may arise (e.g., due to positioning discrepancies or geometric discrepancies during material deposit) that can lead to product deformities. Irregularities may also be due to variations on the forming drum surface that can lead to progressive variations in the position of the elongated elements. Complementary solutions for effective posing of elongated elements have been developed that attempt accurate positioning of the elements prior to verification. These solutions rely upon contact between a pressing member and the tire product disposed on the forming drum surface. For example, PCT Publication WO2015/150970 discloses detection of instantaneous displacements of a pressing member in successive sampling times and considering a variable sum in relation to the drum's rotation speed.

Verification of the deposited product profile may be effected by an image capturing apparatus or by a laser displacement sensor that performs cross-sectional scans before the strip is wrapped. Such verification, however, only occurs after construction of the final product. If the tire suffers any defect, the entire product is destroyed.

In tire production, there exists a very low tolerance for variability in the relative positioning of the elastomeric elements. Incorrect deposition of rubber strips can introduce defects that are hidden by a subsequently applied component. Challenges arise, therefore, to eliminate errors during deposition of the rubber and prior to deposition of subsequent components.

SUMMARY

A tire manufacturing method is provided for controlling a product profile having one or more elastomeric layers that are produced by continuously extruding an elongated element of an elastomeric material and depositing the elongated element upon a forming surface of a circumferentially rotating drum. The process includes feeding the elongated element to a reel assembly at a predetermined flow rate consistent with a rotation speed of the drum. The reel assembly is positioned at a predetermined distance above the forming surface so as to remain out of contact therewith. The elongated element is deposited axially along at least a portion of the forming surface to produce a layer. Data for the product profile is provided that includes at least a target circumferential value of at least a portion of the layer. A value indicative of a distance traveled by the elongated element along a circumferential extent of the rotating drum is detected with a predetermined frequency. The detected value is compared with the target circumferential value at an elapsed time during the deposition cycle. Equivalence between the detected value and the target circumferential value is verified prior to deposition of a subsequent layer.

In some embodiments of the invention, the process includes predicting, based upon the detected value, at least one future circumferential value of the layer at a future elapsed time during the deposition cycle. The predicted circumferential value and the target circumferential value may then be compared.

In some embodiments of the invention, the process includes terminating the deposition cycle in advance of subsequent deposition of another layer. Termination of the deposition cycle occurs upon an indication of non-equivalence either upon comparing the detected value with the target circumferential value, or comparing the predicted circumferential value and the target circumferential value.

In some embodiments, the process includes providing a tension device having a plurality of tension values for selective application of the laying tension. The tension device has selective tension controls set to a value commensurate with a selected product profile.

In some embodiments, a reel assembly is provided that includes a housing, a guide roller and a supply roller. The guide roller is rotatable relative to a shaft that is in spaced parallel relation by a predetermined extent relative to a shaft that rotatably supports the supply roller in the housing. An encoder is associated with at least one of the guide roller and the supply roller to obtain the detected value and calculate an existing circumferential value of the layer based upon the value indicative of the distance traveled by the elongated element. One or more of the predetermined flow rate, the predetermined distance and the predetermined extent may be adjusted during the process.

A system is also provided that performs the disclosed tire manufacturing methods.

A tire is also provided that is formed according to the disclosed methods.

Other aspects of the presently disclosed invention will become readily apparent from the following detailed description.

BRIEF DESCRIPTION OF THE DRAWINGS

The nature and various advantages of the presently disclosed invention will become more apparent upon consid

DETAILED DESCRIPTION

Figure 1:
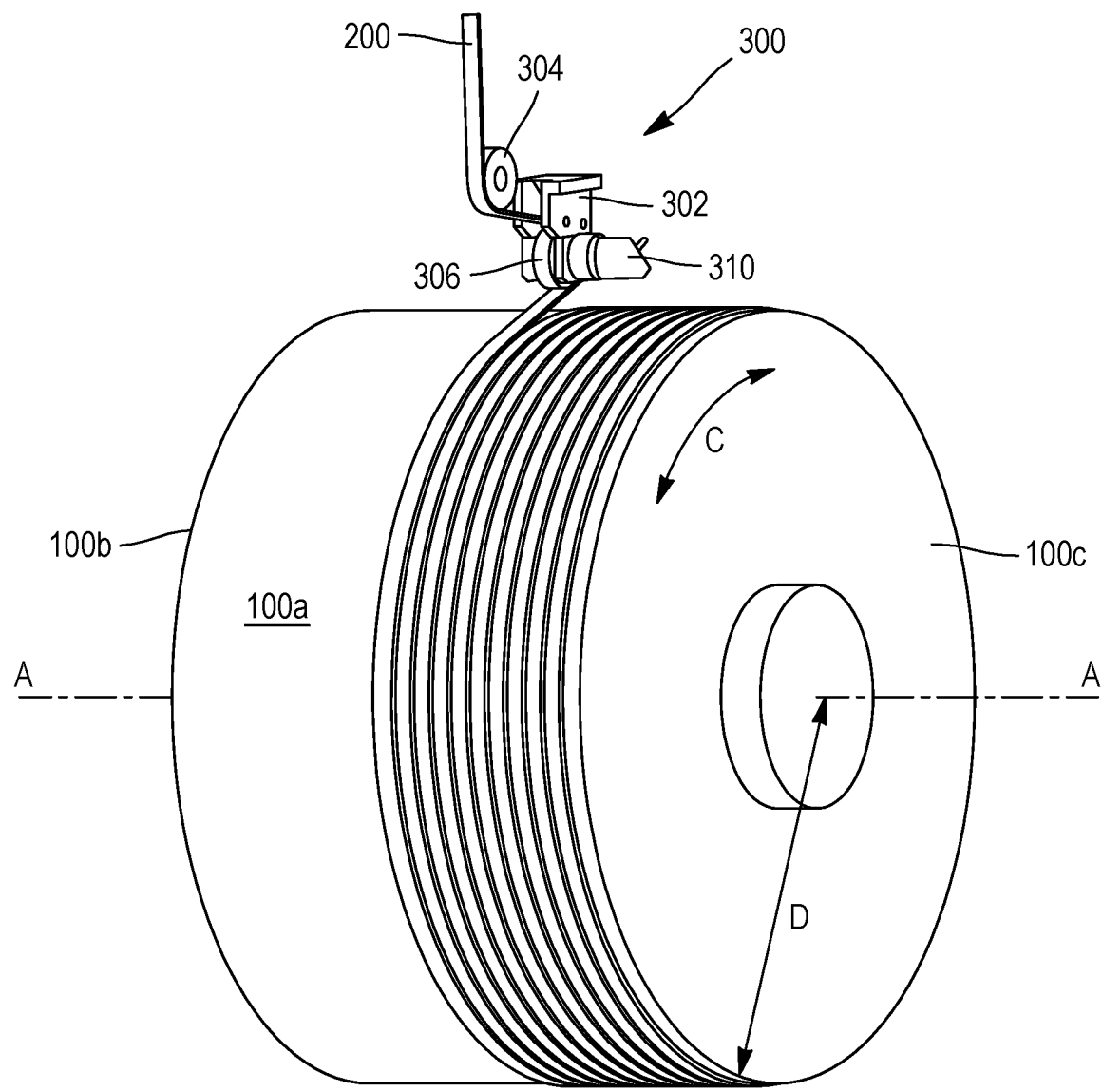
- FIG. 1 shows a front perspective view of a reel assembly in use with a rotating drum.
Figure 2:
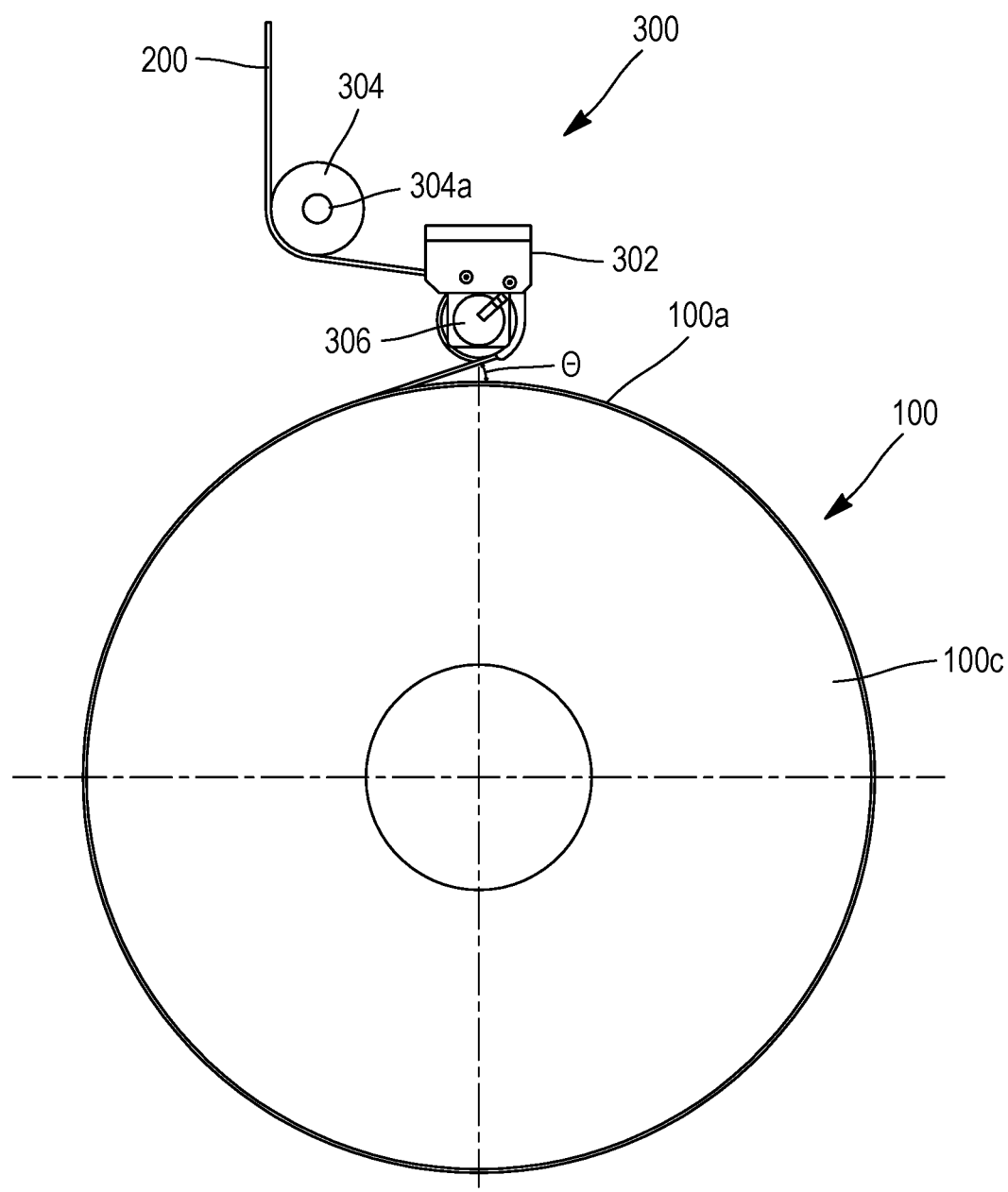
FIGS. 2 and 3 show respective side and front views of the reel assembly of FIG. 1.
Figure 3:
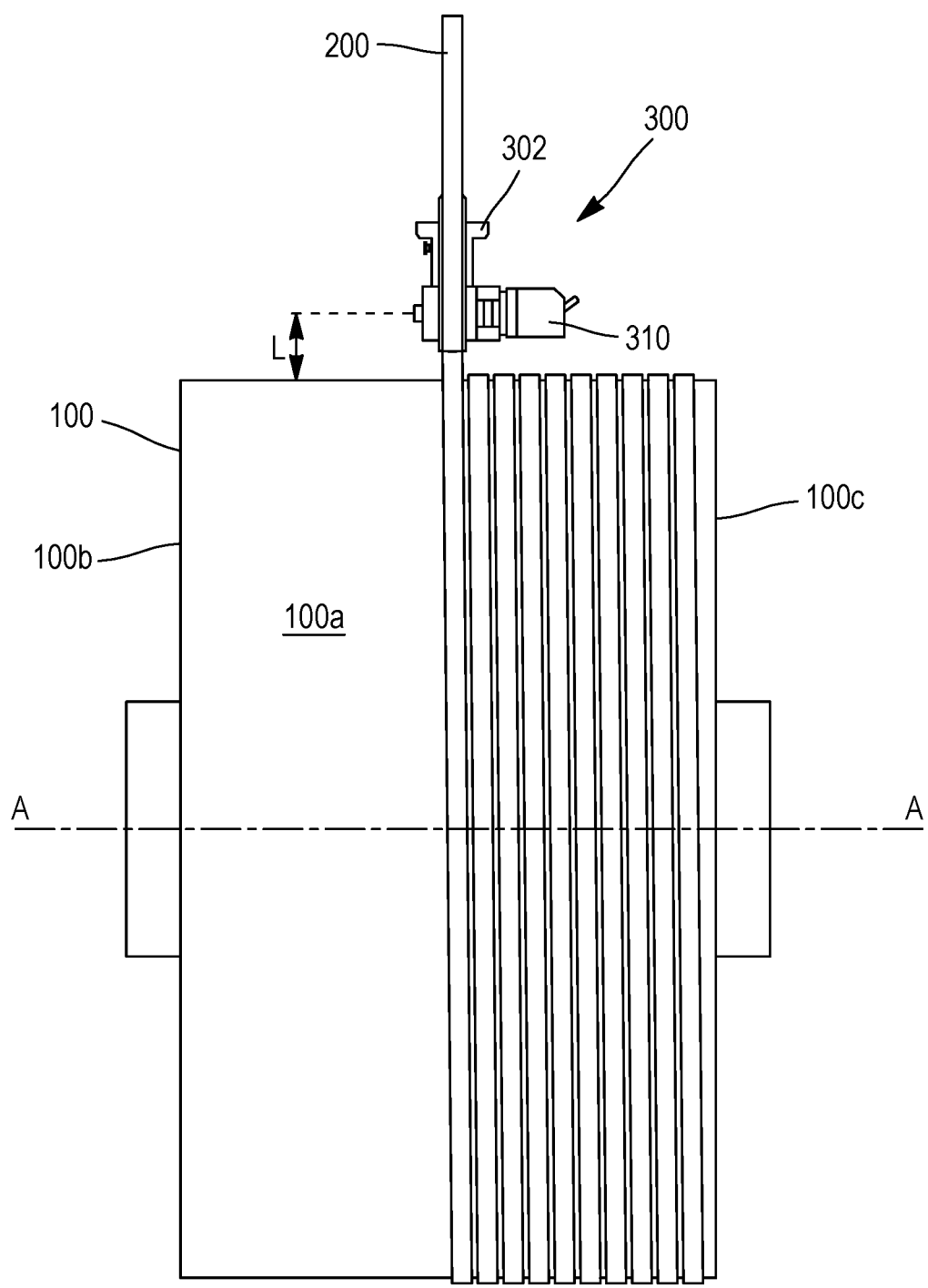

Reference now will be made in detail to embodiments of the invention, one or more examples of which are illustrated in the drawings. Each example is provided by way of explanation and not by limitation. It will be apparent to those skilled in the art that various modifications and variations can be made in the invention without departing from the scope or spirit thereof. For instance, features illustrated or described as part of one embodiment can be used with one or more other embodiments to yield at least one further embodiment. Thus, it is intended that the present invention covers such modifications and variations as come within the scope of the appended claims and their equivalents.

As used herein, a "user" may be a single user or one or more groups of users. A "user" may refer to any apparatus configured for receiving control input and configured to send commands and/or data either interactively or automatically to other devices (including but not limited to user devices, client devices, network-connected devices and devices). As used herein, the term "process" or "method" may include one or more steps performed at least by one electronic or computer-based apparatus having a processor for executing instructions that carry out the steps. Any sequence of steps is exemplary and is not intended to limit methods described herein to any particular sequence, nor is it intended to preclude adding steps, omitting steps, repeating steps or performing steps simultaneously.

Now referring further to the figures, in which like numbers identify like elements, FIGS. 1-7 show an exemplary system for producing one or more rubber products to be incorporated into one or more vehicle tires. As used herein, the term "tires" includes but is not limited to tires used with lightweight vehicles, passenger vehicles, utility vehicles (including heavy trucks), leisure vehicles (including but not limited to bicycles, motorcycles, ATVs, etc.), agricultural vehicles, industrial vehicles, mining vehicles and engineering machines.

Now referring to the figures, wherein like numbers represent like elements, FIG. 1 shows a circumferentially rotating drum 100 having a predetermined diameter D. Drum 100 has a cylindrically-shaped forming surface 100a that is coextensive with opposed sides 100b, 100c. Forming surface 100a is substantially flat along an axial direction A and curved along a circumferential direction C. Drum 100 is rotatable so as to allow forming surface 100a to receive various components thereon during tire construction. Since a drum 100 has a constant diameter D, the circumferential measurement of forming surface 100a (i.e., without supporting any components) remains constant. As used herein, "drum," "assembly drum" and "tambour" may be used interchangeably to refer to a circumferentially rotating element having a surface for receipt of one or more tire components during tire manufacture.

A rubber strip 200 is continuously supplied in controlled tension by a reel assembly 300 that traverses an axial extent of the circumferentially rotating forming surface. An extruder (not shown) produces rubber strip 200 as an elongated element of elastomeric material having a predetermined length that is spirally wound around a circumferential extent of forming surface 100a. The predetermined length may be obtained by cutting the extruded material and sequentially placing the cut strips on a forming surface 100a. Rubber strip 200 may be deposited directly upon forming surface 100a or it may be deposited upon one or more other components (e.g., an impermeable layer). Rubber strip 200 may incorporate one or more textile or metallic reinforcing elements as is known in the art.

As drum 100 rotates, an extruder (not shown) supplies rubber strip 200 to reel assembly 300 having a housing 302. The extruder continuously feeds rubber strip 200 at a predetermined flow rate consistent with a rotation speed of drum 100.

Reel assembly 300 includes a guide roller 304 that feeds the rubber strip to a supply roller 306. Guide roller 304 is rotatable about a shaft 304a that is in spaced parallel relation to a shaft 306a that rotatably supports supply roller 306. Shaft 306a is journaled for rotation by a bearing 308 that is disposed in housing 302. The relative positioning of rollers 304, 306 and forming surface 100a allows strategic application of tension. An adjustable brake device having selective tension controls (not shown) can complement tension adjustment. Tension may be selectively applied to rubber strip 200 at a value that is commensurate with the product profile (e.g., a height of the rubber as it is layered upon forming surface 100a).

An encoder 310 is provided that is in signal communication with one or more processors (such as one or more programmable logic controllers or PLCs). One or more profile contours may be preprogrammed such that a single production session can accommodate identical contours multiple times and/or varying contours in succession. One or more controllers or control systems (collectively "controllers") may determine the instructions to drive reel assembly 300 (e.g., according to tension values, measured circumference values and correction algorithms). Such controllers may also synchronize a longitudinal advance of rubber strip 200 as determined by circumferential movement of the drum so as to strategically apply tension during the cycle. These controllers may communicate with one or more sensors (e.g., to determine a length of material deposited, which corresponds to a measurement of the circumference of the forming surface 100a) and one or more timers as is known in the art.

The encoder may be an optical encoder that converts rotary displacement into digital or pulse signals. The encoder measures angular displacement of shaft 306a (and commensurate displacement of supply roller 306) with respect to a starting point, which may be an internal reference point. Supply roller 306 may be divided at its circumference into a predetermined number of equal sectors. As supply roller 306 rotates during deposit of rubber strip 200, the encoder generates an electrical output for each passing sector. The sectors are counted and accumulated to obtain a number that represents the angular displacement. For example, it is understood that a calculation of circumference (C) is the product of $\pi$ and a diameter (D) of the object for which the calculation is made ($C=\pi*D$). A distance (DIS) travelled by a rotating object having a circumference (C) can therefore be determined by the number of rotations (N) made by the object (as determined by the formula DIS= ((Encoder ticks/360)*C).

A similar encoder may also be provided with respect to shaft 304*a* and calculation of the distance travelled by guide roller 304. Use of an encoder with guide roller 304 effects measurement of an outer circumferential extent of forming surface 100*a* as rubber strip 200 is laid thereon. Such measurement may be selectively made alone or it may complement the measurement of an inner circumferential extent that is made by an encoder associated with supply roller 306. The invention contemplates use of an encoder with at least one of guide roller 304 and supply roller 306 to enable selective measurement and monitoring of the rubber strip. When encoders are employed for both rollers, the extent of the stretching and deformation of the rubber is ascertainable, thereby leading to an indication of natural fiber deformation. Upon such detection, the build can be terminated prior to deposition of a subsequent rubber layer.

Upon commencement of rubber deposition, reel assembly 300 deposits rubber strip 200 along a selected axial portion of forming surface 100*a*. Deposition can commence along any axial portion of the forming surface and can also be optionally segmented (e.g., when producing a product having an uneven profile). Rubber strip 200 can be posed along an axial extent of forming surface 102*a* so as to avoid modifications to the drum that are dimension specific. Posing may include use of a transporter (not shown) that axially advances reel assembly 300 (and therefore rubber strip 200) between opposed sides 100*b*, 100*c*. In this manner, the invention is equally effective for both simple structures (e.g., those having an interior liner and a carcass reinforcement ply) and more complex structures (e.g., those having a plurality of carcass reinforcement plies, those having profiled sidewall reinforcements, etc.).

When deposition is complete, reel assembly 300 resumes a position where it remains ready for a subsequent deposition cycle.

As shown in the figures, reel assembly 300 is axially and reciprocatingly displaceable relative to a predetermined distance L above forming surface 100*a*. Reel assembly 300 remains at predetermined distance L while the extruder charges supply roller 306 with elastomeric material. Predetermined distance L has a value commensurate with the product profile and may be modified if the circumferential measurement indicates deviation from the required circumferential value.

During deposition, supply roller 306 never contacts forming surface 100*a* in order to obtain a precise measurement. This feature differs from conventional systems that maintain constant contact of a pressing member against the moving drum surface. Such contact subjects the pressing member to oscillations that are indicative of anomalies along the drum surface (e.g., clots in the extruded material, breaks in the rubber strip, etc.). The pressure upon the uncured rubber, however, introduces new disturbances that remain undetected until after the final tire is assembled. Rather than introducing new defects during measurement, the invention avoids their creation. Instead, comparative circumferential measurement is performed at the time of rubber deposition without prolonging the deposition cycle time.

Guide roller 304 guides rubber strip 200 along a linear path toward supply roller 306. Guide roller 304 is shown with an axis of shaft 304*a* positioned by a predetermined extent l relative to predetermined distance L. Predetermined extent l is modifiable in accordance with the required tension value for the rubber strip. Shafts 304*a*, 306*a*, however, remain in parallel spaced relation to preserve alignment of rubber strip 200 during transit from the extruder to supply reel 306.

Figure 4:
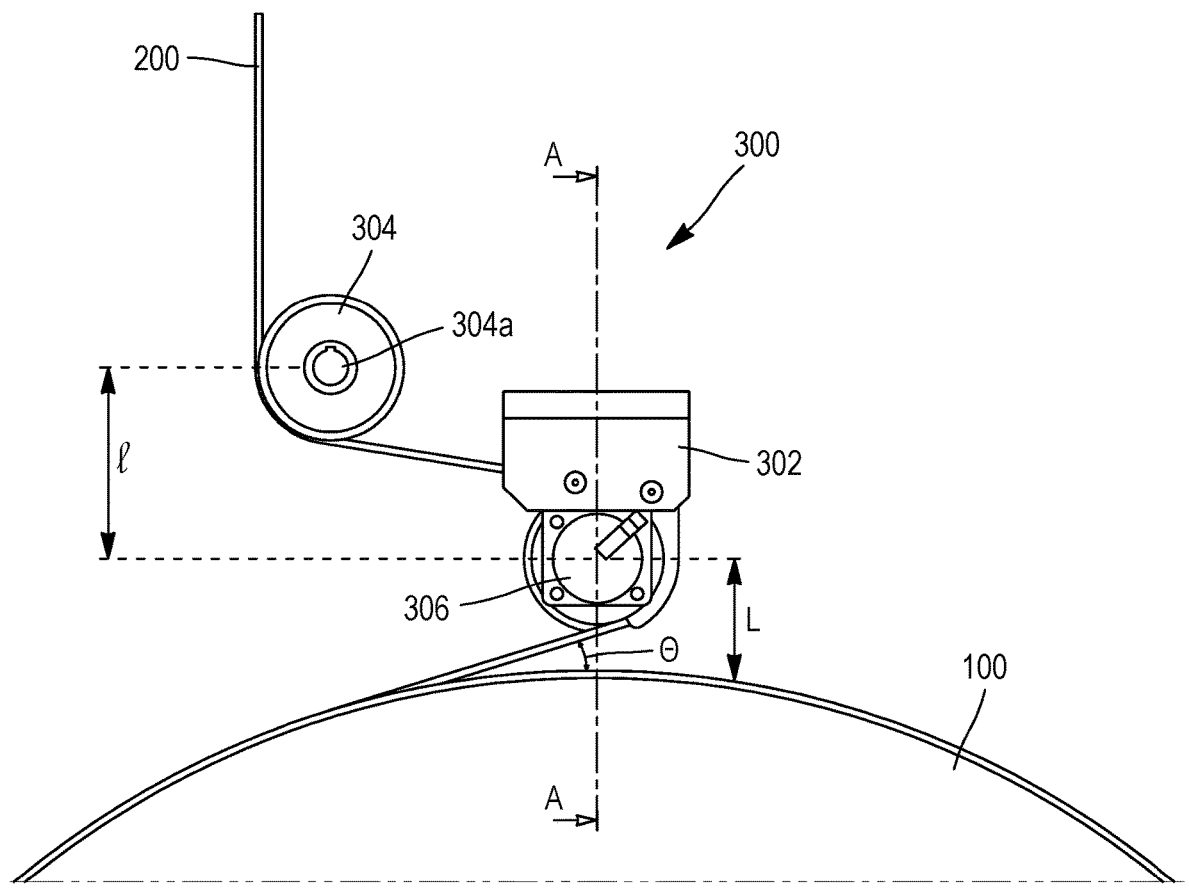
FIG. 4 shows a partial side view of the reel assembly of the figures.
Figure 5:
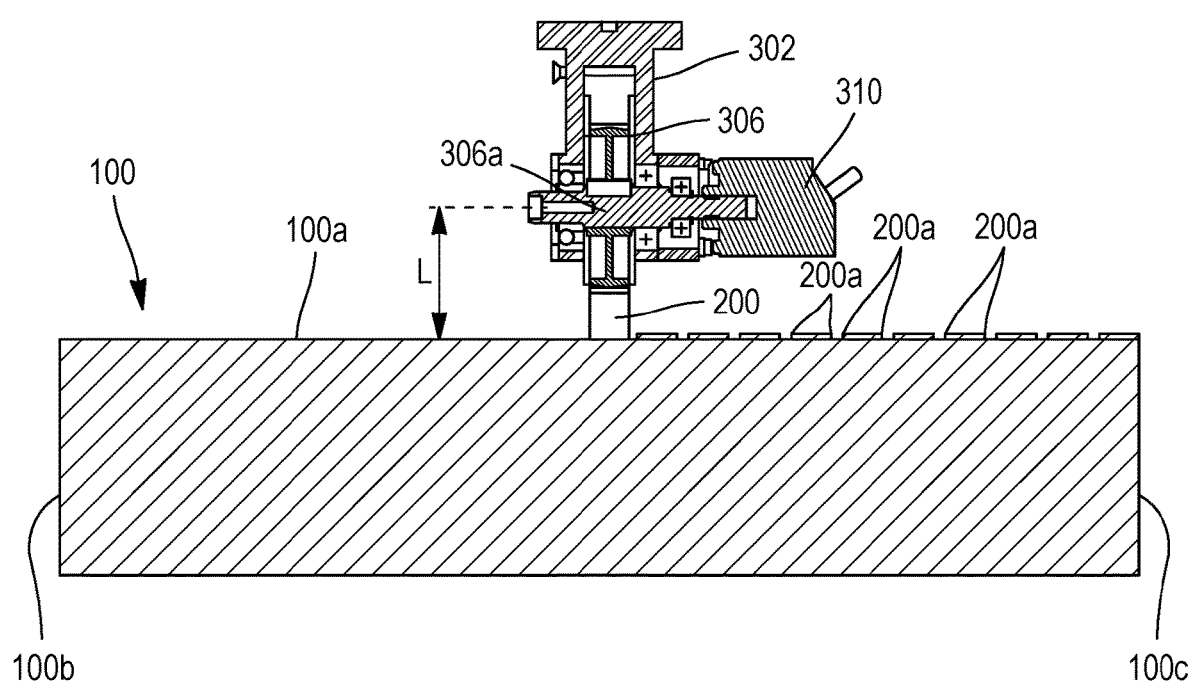
FIG. 5 shows a sectional view along line A-A of FIG. 4.
Figure 6:
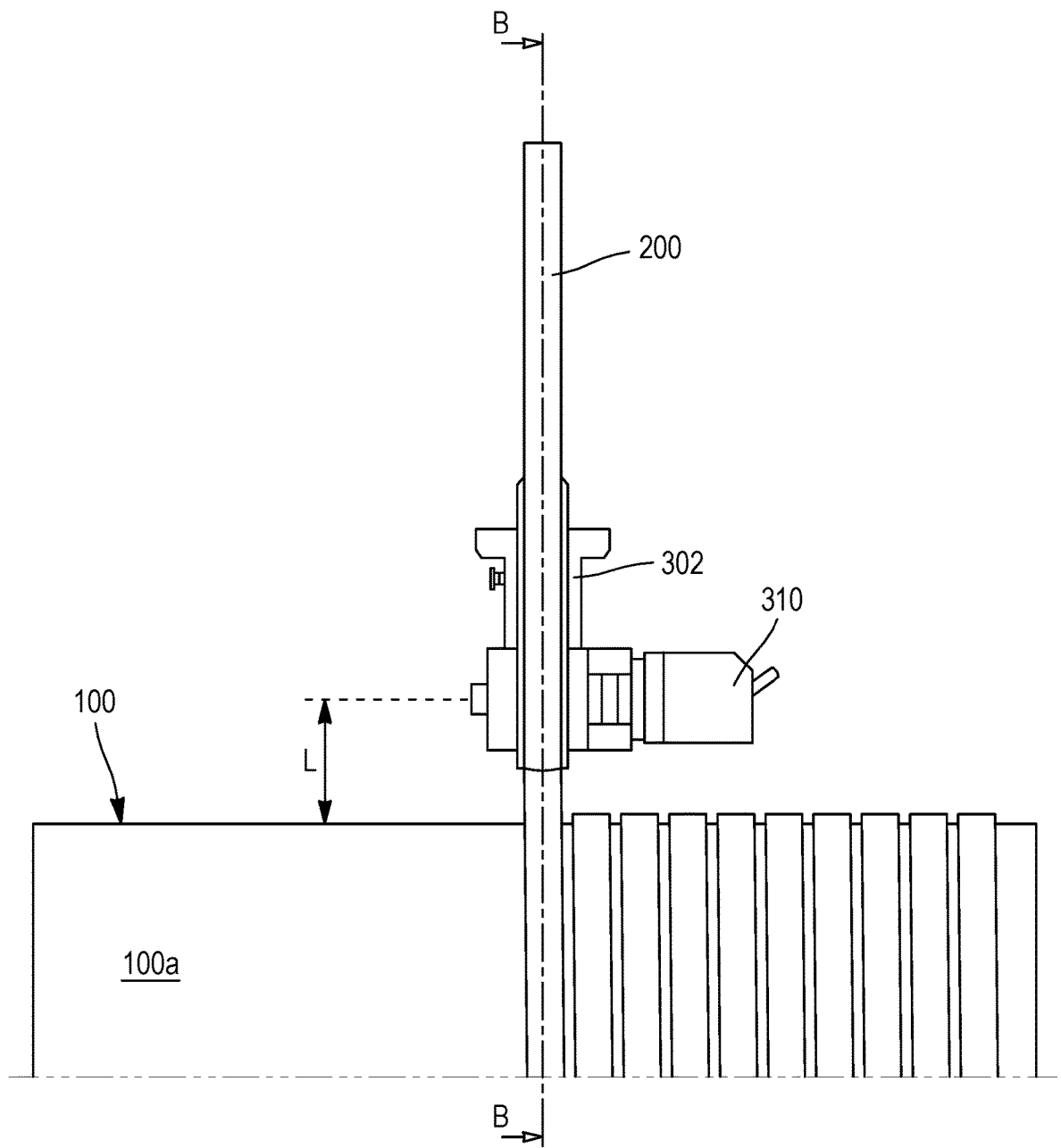
FIG. 6 shows a partial front view of the reel assembly of the figures.
Figure 7:
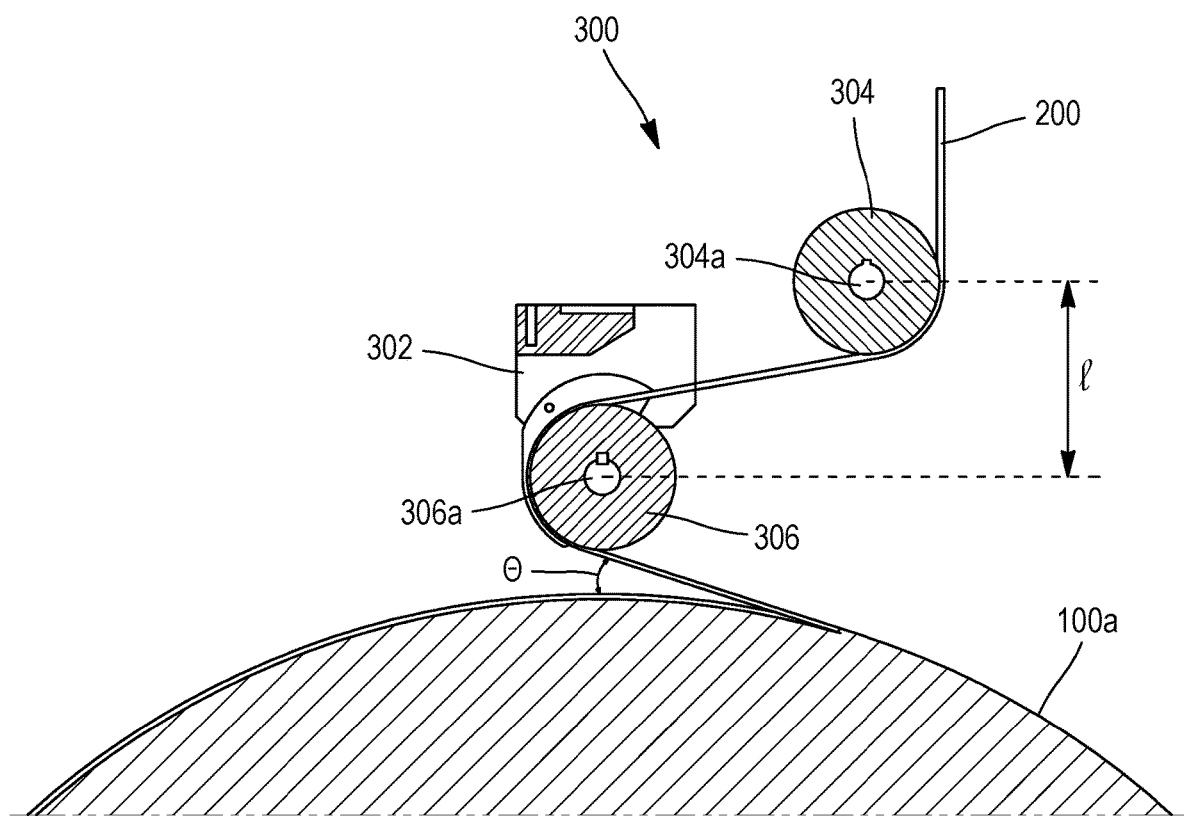
FIG. 7 shows a sectional view along line B-B of FIG. 6.

Rubber strip 200 is wound around a circumferential extent of supply roller 306 as drum 100 circumferentially advances to a position for receiving the elastomeric material. As shown in FIG. 4, reel assembly 300 is located at predetermined distance L from forming surface 100*a*. At this location, shaft 306*a* rotates about a respective rotational axis such that rubber strip 200 forms an angle Θ with respect to a tangential plane. At this angle, supply roller 306 axially and spirally deposits rubber strip 200 around forming surface 100*a*. As shown in FIG. 5, adjacent strips edges 200*a* do not overlap, although it is understood, however, that the strip edges may overlap for some product profiles.

As supply roller 306 deposits rubber strip 200, encoder 310 acquires the detected circumferential distance traveled by the supply roller. The encoder acquires values that are indicative of the displacement of rubber strip 200 along the circumferential and axial directions. The encoder can acquire these values continuously or intermittently.

Deposition of rubber strip 200 can be effected in one or more layers according to a predetermined sequence. The circumference of each layer is measured during deposition of that layer and compared with a predicted threshold value. If non-equivalence is indicated, a warning signal may be generated and the process interrupted.

During creation of any layer, rubber strip 200 is deposed either directly upon forming surface 100*a* or directly upon one or more other previously created layers. In either case, one or more additional components may be disposed on forming surface 100*a*. In some embodiments, different components may be fabricated on a variety of forming supports and assembled on drum 100. These components have predetermined attributes such that their deposition has a known effect on a subsequent circumferential measurement.

In some embodiments of the invention, guide roller 304 has an encoder associated therewith (not shown), which encoder either substitutes or complements the encoder associated with supply roller 306. It is understood that any encoder used with either or both of rollers 304, 306 may include a device that generates signals indicative of displacement of the respective roller with which it is in communication. Such device can include one or more of a speedometer, an accelerometer, a position sensor and any equivalent and complementary device.

The inclusion of encoders at one or both of rollers 304, 306 enables suitable identification of anomalies that occur during deposition of rubber layer. Since such anomalies are readily identified upon comparing the circumferential measurement of deposited layers (or portions of deposited layers) against predicted threshold values, the positions of the anomalies are easily determined as reel assembly moves axially relative to drum forming surface 100*a*. Circumferential measurement is iterative for the entire duration of the deposition cycle such that each layer, and even portions of each layer, may be verified prior to deposition of a subsequent layer.

Deposition of rubber layers may be effected and adjusted at different elapsed times on the basis of the unique requirements of the tire. For some tires, circumferential measurement of the product profile can be effected after deposition of each layer. For some other tires, circumferential measurement can be effected after a predetermined elapsed time (e.g., if the predicted threshold value is determined for several layers that consider acceptable deviations from established tolerances).

For example, if, at an elapsed time, the detected circumference of the product along a specific profile portion is lower than a predicted circumference, one or more process parameters (e.g., a rotational speed of drum 100 or an extrusion flow rate) may be adjusted accordingly prior to a subsequent layer or a subsequent elapsed time. If, at an elapsed time or after a pre-set number of layers, the target circumference is not realized (indicating the presence of one or more anomalies), the process may be stopped altogether.

Encoders that are used in reel assembly 300 may be in signal communication with a monitoring system that includes at least one programmable controller. The programmable controller may have programmed therein established data for a plurality of product profiles and commensurate drum profiles used for their production. The data may include established circumferential values such that actual measured circumferences may be respectively compared thereagainst. Additional data may include at least pre-determined diameters (e.g., for drum 100, guide roller 304 and supply roller 306), predetermined tension values and values for predetermined distance L. Using this data, the monitoring system can be configured to receive the encoder signals and indicate a corresponding anomaly. All or part of the monitoring system may be housed in a central control center or controlled remotely via a network.

The monitoring system can receive the commensurate encoder signals and, based upon at the measured circumference, predict an actual circumference of a subsequent rubber layer during the current deposition cycle. The prediction may include predicting whether the predicted circumference will be realized (i.e., whether the predicted circumference will be too high or too low in consideration of acceptable tolerances). The monitoring system is configured to compare the target quantities of circumference with respective predicted quantities. In advance of a subsequent layer, the monitoring system may generate control signals to adjust a process parameter when a comparison indicates non-equivalence. As successful adjustments are performed over time, such adjustments can be repeated during successive deposition cycles to ensure the circumference of any product profile realizes the predicted value. As the contour of the product profile changes (e.g., among varying undulations), a circumferential profile is established such that, after application of a layer (or a portion thereof), a comparison is made with a target circumference to evaluate whether the material has been applied properly.

The invention enhances circumferential measurements of a forming drum that are necessary to accommodate precise deposition of rubber during tire production. In-time measurement as taught herein accommodates modifications that are dimension specific yet avoids costs associated with scrapping defective tire builds. In this manner, a variety of tires are readily produced by existing forming drum systems without compromising the performance benefits thereof and without significant capital expenditures.

One or more networked devices may be implemented with the presently disclosed systems, e.g., in a cluster or other distributed computing system. The network may be a LAN, a WAN, a SAN, a wireless network, a cellular network, radio links, optical links and/or the Internet, although the network is not limited to these network selections. Accompanying interactive software applications may be downloaded on a desktop or uploaded from a remote site onto a mobile device. Instructions for use of the software applications may also be included along with resources for accessing any remote platforms that provide one or more users with an interface for collaboration with others. It is contemplated that a mobile device may be employed that has the software applications pre-loaded for ready use. A server may be further configured to facilitate communication between at least one system as presently disclosed and one or more of the networked devices. A database may be built and accessed that includes stored data (e.g., tire types and sizes, availability of carcass plies, sequence of product assembly, etc.) and calculated data forecasts that can be generated for intended manufacturing integrity.

The dimensions and values disclosed herein are not limited to a specified unit of measurement. For example, dimensions expressed in English units are understood to include equivalent dimensions in metric and other units (e.g., a dimension disclosed as "1 inch" is intended to mean an equivalent dimension of "2.5 cm").

While particular embodiments of the disclosed apparatus have been illustrated and described, it will be understood that various changes, additions and modifications can be made without departing from the spirit and scope of the present disclosure. Accordingly, no limitation should be imposed on the scope of the presently disclosed invention, except as set forth in the accompanying claims.

What is claimed is:

1. A tire manufacturing method for controlling a product profile having one or more elastomeric layers that are produced by continuously extruding an elongated element of an elastomeric material and depositing the elongated element upon a forming surface of a circumferentially rotating drum, the process comprising the following steps:
   feeding the elongated element to a reel assembly at a predetermined flow rate consistent with a rotation speed of the rotating drum, with the reel assembly positioned at a predetermined distance L above the forming surface so as to remain out of contact therewith;
   depositing the elongated element axially along at least a portion of the forming surface to produce a layer;
   providing data for the product profile that includes at least a target circumferential value of at least a portion of the layer;
   detecting, with a predetermined frequency, a value indicative of a distance traveled by the elongated element along a circumferential extent of the rotating drum;
   comparing the detected value with the target circumferential value at an elapsed time during the deposition cycle; and
   verifying equivalence between the detected value and the target circumferential value prior to deposition of a subsequent layer.

2. The tire manufacturing method of claim 1, further comprising the steps of:
   predicting, based upon the detected value, at least one future circumferential value of the layer at a future elapsed time during the deposition cycle; and
   comparing the predicted circumferential value and the target circumferential value.

3. The tire manufacturing method of claim 1, further comprising the step of:
   terminating the deposition cycle in advance of subsequent deposition of another layer,
   wherein termination of the deposition cycle occurs upon an indication of non-equivalence either upon:
   (a) comparing the detected value with the target circumferential value, or
   (b) comparing the predicted circumferential value and the target circumferential value.

4. The tire manufacturing method of claim 1, wherein depositing the elongated element includes at least one of:
placing the elongated element over the forming surface during selective application of a laying tension of the elongated element; and
placing the elongated element over one or more tire components previously disposed on the forming surface.

5. The tire manufacturing method of claim 4, further comprising the step of:
providing a tension device having a plurality of tension values for selective application of the laying tension and having selective tension controls set to a value commensurate with a selected product profile.

6. The tire manufacturing method of claim 1, further comprising the step of:
providing the reel assembly, wherein the reel assembly comprises:
a housing;
a guide roller;
a supply roller, wherein the guide roller is rotatable relative to a shaft that is in spaced parallel relation by a predetermined extent l relative to another shaft that rotatably supports the supply roller in the housing; and
an encoder associated with at least one of the guide roller and the supply roller to obtain the detected value and calculate an existing circumferential value of the layer based upon the value indicative of the distance traveled by the elongated element.

7. The tire manufacturing method of claim 6, further comprising the step of:
adjusting one or more of the predetermined flow rate, the predetermined distance L and the predetermined extent l.

8. The tire manufacturing method of claim 7, further comprising the step of:
providing a monitoring system that is configured to receive signals indicative of the detected value and to send one or more commensurate control signals to perform the adjusting.

9. The tire manufacturing method of claim 1, further comprising the steps of:
programming one or more product profiles into at least one programmable controller such that the target circumferential value is selectable from a plurality of product profiles.

10. The tire manufacturing method of claim 1, further comprising the step of:
performing at least one of the steps iteratively.

11. A system for performing a tire manufacturing method according to claim 1 comprising a reel assembly having a housing, a guide roller and a supply roller, wherein the guide roller is rotatable relative to a shaft that is in spaced parallel relation by a predetermined extent l relative to another shaft that rotatably supports the supply roller in the housing, and with the reel assembly having an encoder associated with at least one of the guide roller and the supply roller to obtain the detected value and calculate an existing circumferential value of the layer based upon the value indicative of the distance traveled by the elongated element.

12. The system of claim 11, further comprising at least one of:
a circumferentially rotating drum having a cylindrically-shaped forming surface being substantially flat along an axial direction and curved along a circumferential direction;
at least one transporter that transports the reel assembly along at least a portion of the axial direction of the forming surface; and
one or more controllers in signal communication with at least one of the rotatable drum and the reel assembly.

* * * * *